(12) United States Patent
Wang

(10) Patent No.: US 12,167,489 B2
(45) Date of Patent: Dec. 10, 2024

(54) DATA TRANSMISSION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 301 days.

(21) Appl. No.: 17/646,679

(22) Filed: Dec. 30, 2021

(65) Prior Publication Data
US 2022/0124859 A1     Apr. 21, 2022

Related U.S. Application Data

(63) Continuation of application No. PCT/CN2019/094753, filed on Jul. 4, 2019.

(51) Int. Cl.
*H04W 76/18* (2018.01)
*H04W 76/12* (2018.01)

(52) U.S. Cl.
CPC .......... *H04W 76/18* (2018.02); *H04W 76/12* (2018.02)

(58) Field of Classification Search
CPC ....... H04W 76/18; H04W 76/12; H04W 8/00; H04W 76/22; H04W 76/27
See application file for complete search history.

(56) References Cited

U.S. PATENT DOCUMENTS

| 10,356,837 | B2 | 7/2019 | Chen |
| 10,531,388 | B2 | 1/2020 | Kubota et al. |
| 2015/0071169 | A1 | 3/2015 | Wang |
| 2018/0092157 | A1 | 3/2018 | Chen |
| 2018/0220486 | A1 | 8/2018 | Tseng et al. |

(Continued)

FOREIGN PATENT DOCUMENTS

| CN | 107241764 A | 10/2017 |
| CN | 107734542 A | 2/2018 |

(Continued)

OTHER PUBLICATIONS

"3rd Generation Partnership Project; Technical Specification Group Radio Access Network; NR; NR and NG-RAN Overall Description; Stage 2 (Release 15)", 3GPP TS 38.300 V15.6.0 (Jun. 2019). 99 pages.

(Continued)

*Primary Examiner* — Jung H Park
(74) *Attorney, Agent, or Firm* — PERKINS COIE LLP

(57) ABSTRACT

Provided are data transmission methods and apparatuses and a communication device. The method may include: receiving an RRC resume request by a target base station from a terminal device, the RRC resume request message carrying packet data; and acquiring the packet data by the target base (Continued)

station from the RRC resume request message, and sending a retrieve terminal context request message to an anchor base station, the retrieve terminal context request message carrying first information, and the first information being used for the anchor base station to determine whether to send a context of the terminal device to the target base station.

20 Claims, 16 Drawing Sheets

(56) References Cited

U.S. PATENT DOCUMENTS

| | | | | |
|---|---|---|---|---|
| 2018/0227851 | A1* | 8/2018 | Kubota | H04W 52/44 |
| 2018/0302914 | A1 | 10/2018 | Da Silva et al. | |
| 2020/0351723 | A1* | 11/2020 | Kim | H04W 36/08 |
| 2021/0126747 | A1* | 4/2021 | Kim | H04L 1/1861 |
| 2022/0015007 | A1* | 1/2022 | Han | H04W 8/14 |

FOREIGN PATENT DOCUMENTS

| | | |
|---|---|---|
| CN | 107889274 A | 4/2018 |
| CN | 108347726 A | 7/2018 |
| CN | 109952747 A | 6/2019 |

OTHER PUBLICATIONS

"3rd Generation Partnership Project; Technical Specification Group Services and System Aspects; Study on Cellular Internet of Things (CIoT) support and evolution for the 5G System (5GS) (Release 16)", 3GPP TR 23.724 V16.1.0 (Jun. 2019). 274 pages.
Interdigital Communications et al., "On Small Data transmission without Path Switch (R3-190039/S2-1813394)", 3GPP TSG-RAN WG3 #103 R3-190367, Athens, Greece Feb. 25-Mar. 1, 2019. 8 pages.
Supplementary European Search Report in the European application No. 19936467.0, mailed on May 30, 2022. 10 pages.
Written Opinion of the International Search Authority in the International application No. PCT/CN2019/094753, mailed on Mar. 12, 2020. 9 pages with English Translation.
International Search Report in the international application No. PCT/CN2019/094753, mailed on Mar. 12, 2020. 6 pages.
SA2, "LS on Signalling optimization for RRC Inactive N3 path switch", 3GPP TSG-RAN WG3 #103 R3-190039, Athens, Greece, Feb. 25-Mar. 1, 2019, the whole document, 1 page.
First Office Action of the Chinese application No. 201980092854.8, issued on Jan. 24, 2024, 20 pages with English translation.
Second Office Action of the Chinese application No. 201980092854.8, issued on Aug. 30, 2024. 12 pages with English translation.

* cited by examiner

DATA TRANSMISSION METHOD AND APPARATUS, AND COMMUNICATION DEVICE

CROSS REFERENCE TO RELATED APPLICATION

This is a continuation application of International Patent Application No. PCT/CN2019/094753 filed on Jul. 4, 2019, the content of which is incorporated herein by reference in its entirety.

TECHNICAL FIELD

Embodiments of the disclosure relate to the technical field of mobile communication, in particular to a data transmission method and apparatus, and a communication device.

BACKGROUND

If a target base station to which a terminal device initiates a Radio Resource Control (RRC) connection resume procedure is not an anchor base station, the anchor base station is generally required to transfer context of the terminal device to the target base station. In Long Term Evolution (LTE), Early Data Transmission (EDT) is introduced, which is also known as data transmission or data packet transmission or packet data transmission. When a terminal device has EDT data to be transmitted, the terminal device may initiate the RRC connection resume procedure and implement the EDT through a user plane. In the RRC connection resume procedure triggered by the EDT, whether the context of the terminal device is required to be transferred is not clear, leading to low efficiency of the EDT.

SUMMARY

The embodiments of the disclosure provide data transmission methods and apparatuses, and a communication device.

A data transmission method according to an embodiment of the disclosure may include that: a target base station receives an RRC resume request message from a terminal device, the RRC resume request message being configured to carry packet data the target base station acquires the packet data from the RRC resume request message and sends a retrieve terminal context request message to an anchor base station. The retrieve terminal context request message is configured to carry first information configured to enable the anchor base station to determine whether to send a context of the terminal device to the target base station.

A data transmission method according to an embodiment of the disclosure may include that: a target base station receives an RRC resume request message and packet data from a terminal device, a Media Access Control Service Data Unit (MAC SDU) corresponding to the RRC resume request message and a MAC SDU corresponding to the packet data being multiplexed and transmitted in a same Media Access Control Packet Data Unit (MAC PDU); and the target base station sends a retrieve terminal context request message to an anchor base station, the retrieve terminal context request message being configured to carry first information configured to enable the anchor base station to determine whether to send a context of the terminal device to the target base station.

A data transmission method according to an embodiment of the disclosure may include that a terminal device sends an RRC resume request message to a target base station, the RRC resume request message being configured to carry packet data.

A data transmission apparatus according to an embodiment of the disclosure may include:

a receiving unit, configured to receive from a terminal device an RRC resume request message configured to carry packet data, and to acquire the packet data from the RRC resume request message; and a sending unit, configured to send a retrieve terminal context request message to an anchor base station, the retrieve terminal context request message being configured to carry first information configured to enable the anchor base station to determine whether to send a context of the terminal device to the target base station.

A data transmission apparatus according to an embodiment of the disclosure may include:

a receiving unit, configured to receive an RRC resume request message and packet data from a terminal device, a MAC SDU corresponding to the RRC resume request message and a MAC SDU corresponding to the packet data being multiplexed and transmitted in a same MAC PDU; and a sending unit, configured to send a retrieve terminal context request message to an anchor base station, the retrieve terminal context request message being configured to carry first information configured to enable the anchor base station to determine whether to send a context of the terminal device to the target base station.

A data transmission apparatus according to an embodiment of the disclosure may include:

a sending unit, configured to send an RRC resume request message to a target base station, the RRC resume request message being configured to carry packet data.

A communication device according to an embodiment of the disclosure may include a processor and a memory. The memory is configured to store a computer program, and the processor is configured to call and run the computer program stored in the memory to execute any one of the above data transmission methods.

A chip according to an embodiment of the disclosure is configured to implement any one of the above data transmission methods.

Specifically, the chip may include a processor configured to call and run a computer program from a memory to enable a device mounted with the chip to execute any one of the above data transmission methods.

A computer-readable storage medium according to an embodiment of the disclosure is configured to store a computer program which enables a computer to execute any one of the above data transmission methods.

A computer program product according to an embodiment of the disclosure may include computer program instructions which enable a computer to execute any one of the above data transmission methods.

A computer program according to an embodiment of the disclosure enables a computer to execute any one of the above data transmission methods when the computer program is run on the computer.

According to the technical schemes, a retrieve terminal context request message carries the first information configured to enable a anchor base station to determine whether to send a context of a terminal device to a target base station, so that the transfer of the context of the terminal device can satisfy communication requirements better. In a case that the anchor base station determining to send the context of the terminal device to the target base station, packet data may be sent to a core network through the target base station; and in response to the anchor base station determining not to send the context of the terminal device to the target base station, the packet data may be sent to the core network through the anchor base station. Therefore, transmission of packet data is defined clearly, which improves the efficiency of transmission of packet data and saves signaling interactions of network.

BRIEF DESCRIPTION OF THE DRAWINGS

The drawings illustrated herein are merely for further understanding of the disclosure and constitute a part of the disclosure, and the exemplary embodiments of the disclosure and the description thereof are used to illustrate the disclosure and are not intended to unduly limit the disclosure.

DETAILED DESCRIPTION

The technical schemes of the embodiments of the disclosure will be described below with reference to the drawings of the embodiments of the disclosure, and it is apparent that the described embodiments are part, rather all of the embodiments of the disclosure. All other embodiments derived based on the embodiments of the disclosure by those of ordinary skill in the art without making inventive efforts should fall within the scope of the disclosure.

The technical solutions in the embodiments of the present disclosure may be applied to various communication systems, such as: a global system of mobile communication (GSM) system, a code division multiple access (CDMA) system, a wide band code division multiple access (WCDMA) system, general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system or a 5G system, etc.

Figure 1:
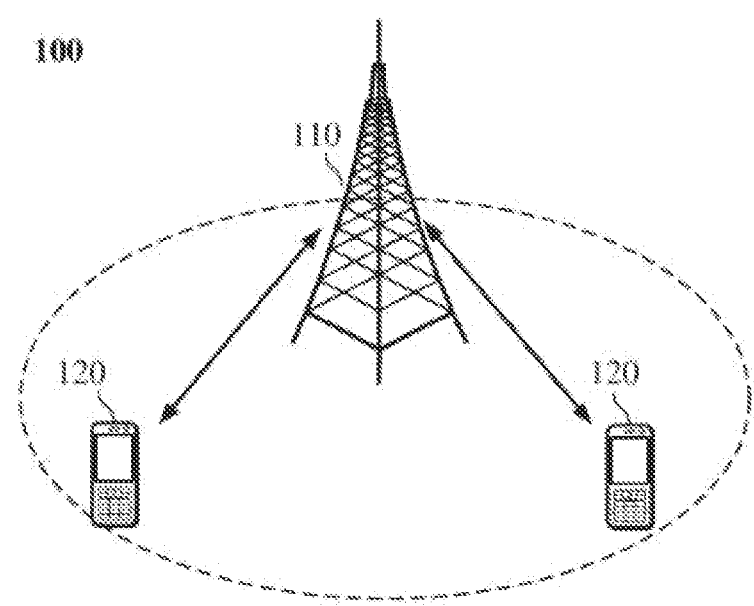
FIG. 1 illustrates a schematic structural diagram of a communication system according to an embodiment of the disclosure.

For example, the communication system 100 applied in the embodiments of the present disclosure is illustrated in FIG. 1. The communication system 100 may include a network device 110, and the network device 110 may be a device that communicates with a terminal 120 (or called as a communication terminal or a terminal). The network device 110 may provide communication coverage for a specific geographic area, and may communicate with terminals located in the coverage area. Optionally, the network device 110 may be a base transceiver station (BTS) in a GSM system or a CDMA system, a base station (NodeB, NB) in a WCDMA system, or an evolved base station in an LTE system (Evolutional Node B, eNB or eNodeB), or the wireless controller in the cloud radio access network (CRAN), or the network device may be a mobile switching center, a relay station, an access point, a vehicle-mounted device, a wearable device, a hub, a switch, a bridge, a router, and a network side device in a 5G network, or a network device in the future evolution of the public land mobile network (PLMN), etc.

The communication system 100 may further include at least one terminal 120 located within the coverage area of the network device 110. "Terminal" as used herein may include, but is not limited to, any device connected via wired lines, such as via a public switched telephone network (PSTN), a digital subscriber line (DSL), a digital cable, and a direct cable connection; and/or via another data connection/network; and/or via a wireless interface, such as for a cellular network, a wireless local area network (WLAN), a digital TV network such as a DVB-H network, a satellite network, an AM-FM broadcast transmitter; and/or an apparatus of another terminal configured to receive/send communication signals; and/or an internet of things (IoT) device. A terminal configured for communication through a wireless interface may be referred to as a "wireless communication terminal", a "wireless terminal" or a "mobile terminal". Examples of mobile terminals include, but are not limited to, satellite or cellular phones; personal communications system (PCS) terminals that can combine cellular radio phones with data processing, fax, and data communication capabilities; a PDA that may include a radio phone, a pager, an Internet/intranet access, a Web browser, a memo pad, a calendar, and/or global positioning system (GPS) receiver; as well as a conventional laptop and/or palmtop receiver or other electronic devices including a radio telephone transceiver. "Terminal" may refer to an access terminal, a user equipment (UE), a user unit, a user station, a mobile station, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), and a handheld device with wireless communication function, a computing device or other processing devices connected to a wireless modem, a vehicle-mounted device, a wearable device, a terminal in a 5G network, or a terminal in the future evolution of PLMN, etc.

Optionally, device to device (D2D) communication may be performed between the terminals 120.

Optionally, the 5G system or the 5G network may also be referred to as a new radio (NR) system or a NR network.

FIG. 1 exemplarily illustrates one network device and two terminals. Optionally, the communication system 100 may include a plurality of network devices and the coverage of each network device may include other numbers of terminals than two, which will not be limited in the embodiments of the present disclosure.

Optionally, the communication system 100 may also include other network entities such as a network controller and a mobility management entity, which will not limited in the embodiments of the present disclosure.

It should be understood that a device with a communication function in the network/system in the embodiments of the present disclosure may be referred to as a communication device. Taking the communication system 100 illustrated in FIG. 1 as an example, the communication device may include a network device 110 and a terminal 120 with communication functions, and the network device 110 and the terminal 120 may be the specific devices described above, which will not be repeated here. The communication device may also include other devices in the communication system 100, such as other network entities such as a network controller and a mobility management entity, which will not be limited in the embodiments of the present disclosure.

It should be understood that the terms "system" and "network" in the disclosure are often used interchangeably. The term "and/or" is only an association relationship describing the associated objects, which means that there can be three kinds of relationships. For example, A and/or B may represent these three situations including that: A alone exists, A and B exist at the same time, and B alone exists. In addition, the character "%" generally indicates that the associated objects before and after the character "/" are in an "or" relationship.

In order to facilitate the understanding on the technical solutions in the embodiments of the present disclosure, the technical schemes of the embodiments of the disclosure will be described below.

Three RRC States

In a 5G network, a new RRC state, i.e., RRC_INACTIVE state, is defined to reduce air interface signaling and quickly resume wireless connection and data service. The RRC_INACTIVE state is different from an RRC_IDLE state and RRC_CONNECTED state.

The three RRC states in the 5G network are illustrated below.

1) RRC_IDLE state (hereinafter referred to as idle state): mobility is implemented based on cell reselection of a UE, paging is initiated by a Core Network (CN), and a paging area is configured by the CN. No UE AS context exists at a base station. No RRC connection exists.

2) RRC_CONNECTED state (hereinafter referred to as a connected state): RRC connection exists, and a UE AS context exists in a base station and a UE. The network knows that the UE is in a specific cell. Mobility is controlled by the network. Unicast data may be transmitted between the UE and the base station.

3) RRC_INACTIVE state (hereinafter referred to as inactive state): mobility is implemented based on cell reselection of a UE, connection between a CN and a RAN exists, a UE AS context exists in a certain base station, paging is triggered by the RAN, a paging area based on RAN is managed by the RAN, and the network knows that the UE is in the paging area based on the RAN.

When a UE is in the inactive state, the UE may be triggered to switch to the idle state in any one of the following situations: 1) a CN initiated paging message is received; 2) a timer times out, the timer being T319 that is started when an RRC resume request is initiated; 3) MSG4 integrity protection verification fails; 4) cell reselection is performed by another radio access technology (RAT); and 5) the UE comes into a state of residing in any cell.

RAN Notification Area (RNA)

When a UE is in the inactive state, the network may configure inactive configuration parameters to the UE through RRC specific signaling (such as an RRC release message). Main configuration parameters include: 1) an Inactive Radio Network Temporary Identifier (I-RNTI), which is configured to identify a UE inactive context of the UE in a base station and is unique in the base station; 2) a RNA, which is configured to control an area within which the UE in the inactive state may perform cell reselection and is also a paging area of initial paging of the RAN; 3) a RAN discontinuous reception cycle (RAN DRX cycle), which is configured to calculate paging timing for initial paging of the RAN; 4) a RNA update periodicity (RNAU periodicity), which is configured to control the UE to execute periodic RAN position update; and 5) a Next hop chaining counter (NCC), which is configured for a secret key in a RRC connection resume procedure.

When the UE moves in the RNA, the UE is not required to notify the network and acts following the mobility in the idle state, i.e., following the principle of cell reselection. When the UE moves out of the paging area configured by the RAN, the UE may be triggered to resume an RRC connection and reacquire a paging area configured by the RAN. When downlink data arrives at the UE, a base station maintaining the connection between the RAN and the CN for the UE may trigger all cells in the RAN paging area to send paging messages to the UE, so that the UE in the inactive state is enabled to resume the RRC connection and receive the data. On the other hand, the UE in the inactive state is configured with the RAN paging area, in which the UE is required to perform periodic position update according to a network configured cycle (implemented based on a RNAU timer) to enable data to arrive at the UE. Therefore, the UE may be triggered to perform RNAU when the RNAU timer times out or the UE moves to an area other than the RNA.

When a target base station to which an RRC connection resume procedure initiated by a UE is not an anchor base station, the anchor base station may determine whether a context of the UE is required to be transferred to the target base station. Therefore, generally, the target base station may include a cause that is carried in an RRC connection resume request initiated by the UE into a retrieve UE context request message, and send the cause to the anchor base station, and the anchor base station may determine whether the context of the UE is required to be transferred to the target base station. The UE context transfer will be illustrated with reference to a RNAU below.

Figure 2A:
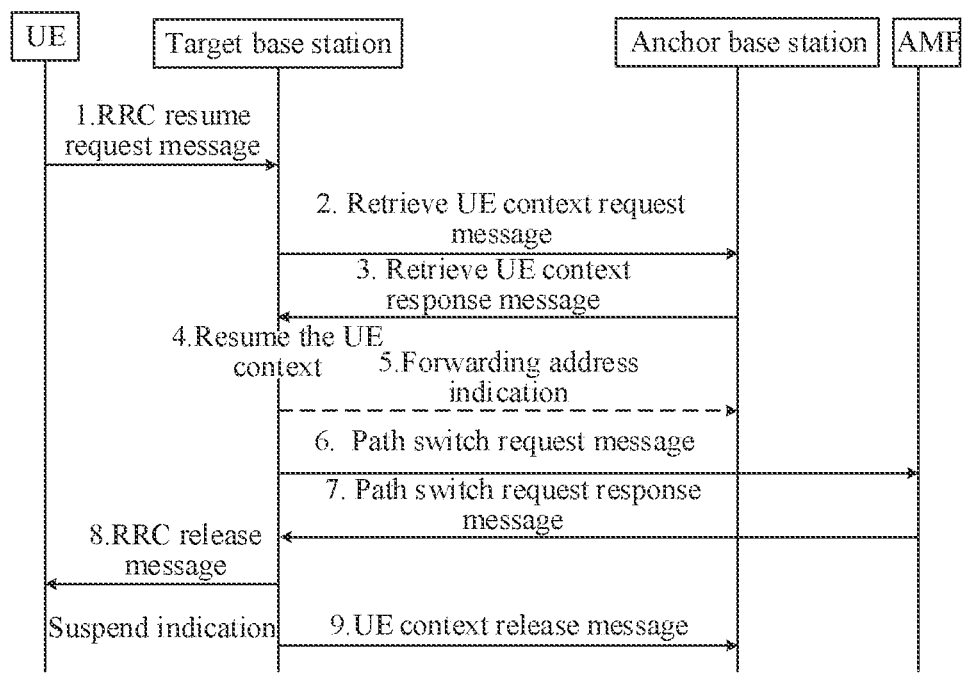
FIG. 2A illustrates a flowchart of an RNAU with context transfer according to an embodiment of the disclosure.

FIG. 2A illustrates a flowchart of an RNAU with context transfer, including the following operations.

1. A UE sends an RRC resume request message to a target base station.

Herein, the RRC resume request message is configured to carry a RRC resume cause, i.e., an RNAU.

2. The target base station sends a retrieve UE context request message to an anchor base station.

Herein, the retrieve UE context request message is configured to carry the RNAU.

3. The anchor base station sends a retrieve UE context response message to the target base station.

4. The target base station resumes the UE context.

5. The target base station sends a data forwarding address indication to the anchor base station.

6. The target base station sends a path switch request message to an AMF (Access and Mobility Management Function).

7. The AMF sends a path switch request response message to the target base station.

8. The target base station sends an RRC release message to the UE, and the RRC release message is configured to carry a suspend indication.

9. The target base station sends a UE context release message to the anchor base station.

Figure 2B:
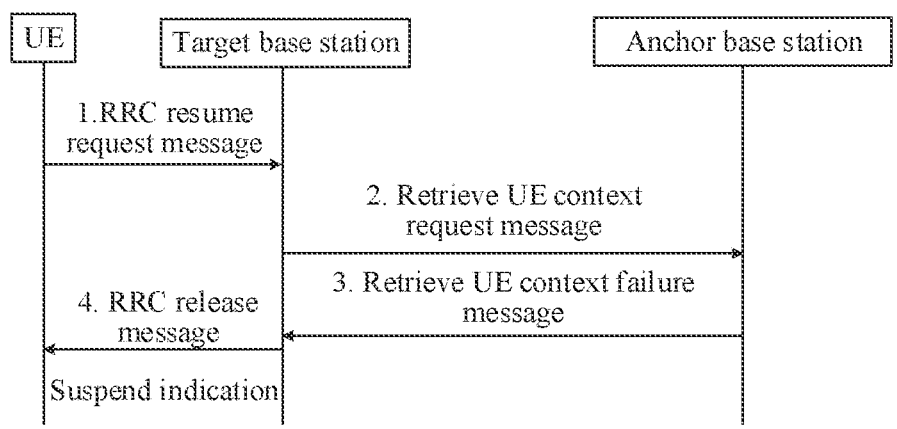
FIG. 2B illustrates a flowchart of an RNAU without context transfer according to an embodiment of the disclosure.

FIG. 2B illustrates a flowchart of an RNAU without context transfer, including the following operations.

1. A UE sends an RRC resume request message to a target base station.

Herein, the RRC resume request message may carry a RRC resume cause, i.e., an RNAU.

2. The target base station sends a retrieve UE context request message to an anchor base station.

Herein, the retrieve UE context request message may carry the RNAU.

3. The anchor base station sends a retrieve UE context failure message to the target base station.

4. The target base station sends an RRC release message to the UE, and the RRC release message is configured to carry a suspend indication.

It should be noted that, the anchor base stations as shown in FIG. 2A and FIG. 2B refer to base stations having stored a UE context. In an example, an anchor base station may be a base station serving a UE last time.

EDT (Early Data Transmission)

EDT is introduced in LTE. In EDT, a UE may be in an idle state, a suspended state or an inactive state constantly to implement uplink and/or downlink EDT.

Figure 3:
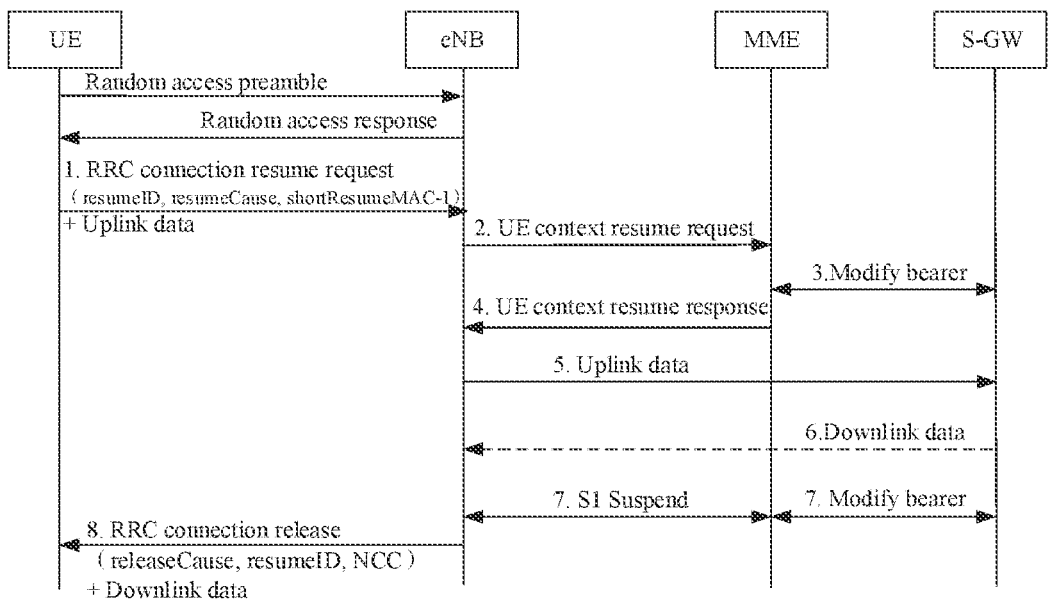
FIG. 3 illustrates a flowchart of transmitting EDT data through a user plane according to an embodiment of the disclosure.

A user plane transmission scheme may be adopted to implement the EDT, as shown in FIG. 3, including the following operations.

1. A UE sends an RRC connection resume request message and uplink data to an eNB.

Herein, the RRC connection resume request may carry the following information: resumeID, resumeCause, and shortResumeMAC-I.

2. The eNB sends a UE context resume request message to a Mobility Management Entity (MME).

3. A bearer between the MME and a Serving Gateway (S-GW) is modified.

4. The MME sends a UE context resume response message to the eNB.

5. The eNB sends uplink data to the S-GW.

6. The S-GW sends downlink data to the eNB.

7. A bearer between the MME and the S-GW is modified, and an SI suspend procedure is executed between the eNB and the MME.

8. The eNB sends an RRC connection release message and the downlink data to the UE.

Herein, the RRC connection release message may carry the following information: releaseCause, releaseID, and NCC.

It should be noted that, FIG. 3 is illustrated by taking LTE as an example. The flow in NR is similar to that of the LTE, and the difference is that in NR the eNB is required to be replaced with a gNB, the MME is required to be replaced with an Access and Mobility Management Function (AMF), and the S-GW is required to be replaced with a User Plane Function (UPF).

As shown in FIG. 3, the RRC connection resume request message is carried in MSG3 in a random access process, and the uplink data belongs to user plane data. The uplink data may be transmitted in a Dedicated Transmission Channel (DTCH), the RRC connection resume request message may be transmitted in a Common Control Channel (CCCH), and a MAC SDU (i.e., DTCH SDU) corresponding to the uplink data and a MAC SDU corresponding (i.e., CCCH SDU) to the RRC connection resume request message may be multiplexed in a same MAC PDU in a MAC stratum. Same as the uplink data, downlink data may be transmitted in a DTCH, the RRC release message may be transmitted in a CCCH, and a MAC SDU (i.e., DTCH SDU) corresponding to the downlink data and a MAC SDU (i.e., CCCH SDU) corresponding to the RRC release message may be multiplexed in a same MAC PDU in a MAC stratum. It should be noted that, the uplink data or the downlink data shown in FIG. 3 may be packet data which is also called as small data or small data packet or EDT data herein.

For the RRC connection resume procedure triggered by sending of uplink packet data, whether a UE context is required to be transferred is not clear, which leads to low efficiency of packet data transmission. In addition, after receiving the MAC PDU corresponding to the packet data, the target base station is required to decode the CCCH in the MAC PDU to obtain the addressing information of the anchor base station. Due to the fact that no bearer configuration information corresponding to the packet data exists, the target base station is required to retrieve the UE context from the anchor base station before decoding the packet data, which leads to increasing data transmission delay. Therefore, the technical schemes of the embodiments of the disclosure are provided below.

Figure 4:
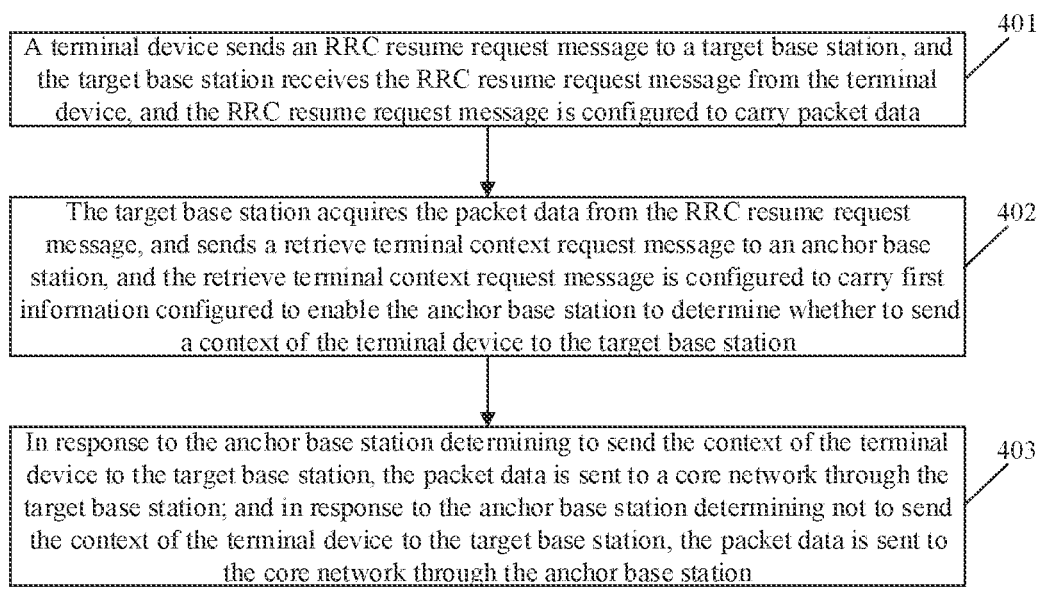
FIG. 4 illustrates a first schematic flowchart of a data transmission method according to an embodiment of the disclosure.

FIG. 4 illustrates a schematic flowchart of a data transmission method according to an embodiment of the disclosure. As shown in FIG. 4, the data transmission method may include the following operations.

Operation 401 includes that: a terminal device sends an RRC resume request message to a target base station, and the target base station receives the RRC resume request message from the terminal device, and the RRC resume request message is configured to carry packet data.

According to the embodiment of the disclosure, the terminal device may be any device capable of communicating with network, such as a mobile phone, a tablet computer, notebook computer, a vehicle-mounted terminal, a wearable device, etc. In an optional implementation, the terminal device may be in an inactive state.

According to the embodiment of the disclosure, the RRC resume request message may carry the packet data, and the carrying may be implemented in the following manner that: 1) the RRC resume request message may include a first container configured to carry the packet data; or, 2) the RRC resume request message may include a first payload configured to carry the packet data.

According to some optional implementations of the disclosure, an RRC resume request message may further carry bearer configuration information corresponding to the packet data. Therefore, a target base station may decode the packet data through the bearer configuration information corresponding to the packet data, thereby acquiring the packet data.

Herein, the bearer configuration information may include at least one of the following: a Logical Channel Identifier (LCID) and a Data Resource Bearer Identifier (DRB ID).

According to the embodiment of the disclosure, the packet data is also called as small data or small data packet or EDT data.

Operation 402 includes that: the target base station acquires the packet data from the RRC resume request message, and sends a retrieve terminal context request message to an anchor base station, and the retrieve terminal context request message is configured to carry first information configured to enable the anchor base station to determine whether to send a context of the terminal device to the target base station.

According to the embodiment of the disclosure, the target base station may acquire a first terminal identifier from the RRC resume request message, address the anchor base station according to the first terminal identifier, and send the retrieve terminal context request message to the anchor base station. Herein, the first terminal identifier may be an I-RNTI.

According to the embodiment of the disclosure, the first information may be carried in the retrieve terminal context request message and may serve as auxiliary information to enable the anchor base station to determine whether to send the context of the terminal device to the target base station. The first information carried in the retrieve terminal context request message may be implemented in the following manners:

1) the first information carried in the retrieve terminal context request message may include at least one of the following: packet data transmission indication information, bearer configuration information corresponding to the packet data; or,
2) the first information carried in the retrieve terminal context request message may include at least one of the following: the packet data, bearer configuration information corresponding to the packet data; or,
3) the first information carried in the retrieve terminal context request message may include at least one of the following: indication information about whether to send the context of the terminal device to the target base station.

It should be noted that, the above 1), 2) and 3) may be implemented alone or in combination. For example, the first information carried in the retrieve terminal context request message may include at least one of the following: packet data transmission indication information, bearer configuration information corresponding to the packet data, and indication information about whether to send the context of the terminal device to the target base station. For example, the first information carried in the retrieve terminal context request message may include at least one of the following: the packet data, bearer configuration information corresponding to the packet data, and indication information about whether to send the context of the terminal device to the target base station.

Herein, the bearer configuration information may include at least one of the following: a LCID, and a DRB ID.

It should be noted that, when the RRC resume request message carries packet data corresponding to multiple bearers, the packet data corresponding to each bearer and the bearer configuration information corresponding to the packet data may be carried respectively. The foregoing merely illustrates a case in which the packet data corresponding to one bearer is transmitted.

Operation 403 includes that: in response to the anchor base station determining to send the context of the terminal device to the target base station, the packet data is sent to a core network through the target base station; and in response to the anchor base station determining not to send the context of the terminal device to the target base station, the packet data is sent to the core network through the anchor base station.

According to the embodiment of the disclosure, the anchor base station refers to a base station having stored the context of the terminal device. In an example, the anchor base station may be a base station serving the terminal device last time.

The transmission of packet data will be illustrated in detail with reference to specific context transfer conditions.

In a case that the anchor base station determines to send the context of the terminal device to the target base station, 1) the target base station may receive a retrieve terminal context response message from the anchor base station, the retrieve terminal context response message carrying the context of the terminal device; 2) the target base station may resume the context of the terminal device, and transmits the data packet to a Packet Data Convergence Protocol (PDCP) stratum for decryption and/or integrity verification according to the bearer configuration information corresponding to the packet data; and 3) the target base station may trigger a core network control plane network element to perform path switching, establish a GPRS Tunnelling Protocol (GTP) tunnel between the target base station and a core network user plane network element after receiving a path switch acknowledge message from the core network control plane network element, and send the packet data to the core network user plane network element through the GTP tunnel.

Herein, the core network control plane network element may be an AMF, and the core network user plane network element may be a UPF.

In a case that the anchor base station determines not to send the context of the terminal device to the target base station, 1) the target base station receives a retrieve terminal context failure message from the anchor base station, the retrieve terminal context failure message carrying GTP tunnel information configured by the anchor base station; 2) the target base station may send the packet data to the anchor base station through a GTP tunnel based on the GTP tunnel information; and 3) the anchor base station may resume the context of the terminal device, transmits the data packet to a PDCP stratum for decryption and/or integrity verification according to the bearer configuration information corresponding to the packet data, and then send the data packet to a core network user plane network element.

Herein, the core network control plane network element may be an AMF, and the core network user plane network element may be a UPF.

Herein, the GTP tunnel information configured by the anchor base station may include at least one of the following: a Tunnel Endpoint ID (TEID) corresponding to the GTP tunnel and bearer configuration information associated with the GTP tunnel. Further, the bearer configuration information may include at least one of the following: a LCID, and a DRB ID.

It should be noted that, the packet data according to the embodiment of the disclosure may be packet data corresponding to one or more DRBs. When the packet data includes packet data corresponding to a DRB, the GTP tunnel information configured by the anchor base station may include GTP tunnel information corresponding to the DRB; and when the packet data may include packet data corresponding to multiple DRBs, the GTP tunnel information configured by the anchor base station may include GTP tunnel information respectively corresponding to the multiple DRBs.

In an alternative implementation, a retrieve terminal context failure message may carry an RRC release message. After receiving the retrieve terminal context failure message from the anchor base station, the target base station may acquire the RRC release message from the retrieve terminal context failure message and send the RRC release message to the terminal device.

The technical scheme of the embodiments of the disclosure will be illustrated below with reference to FIG. 5A and FIG. 5B.

Figure 5A:
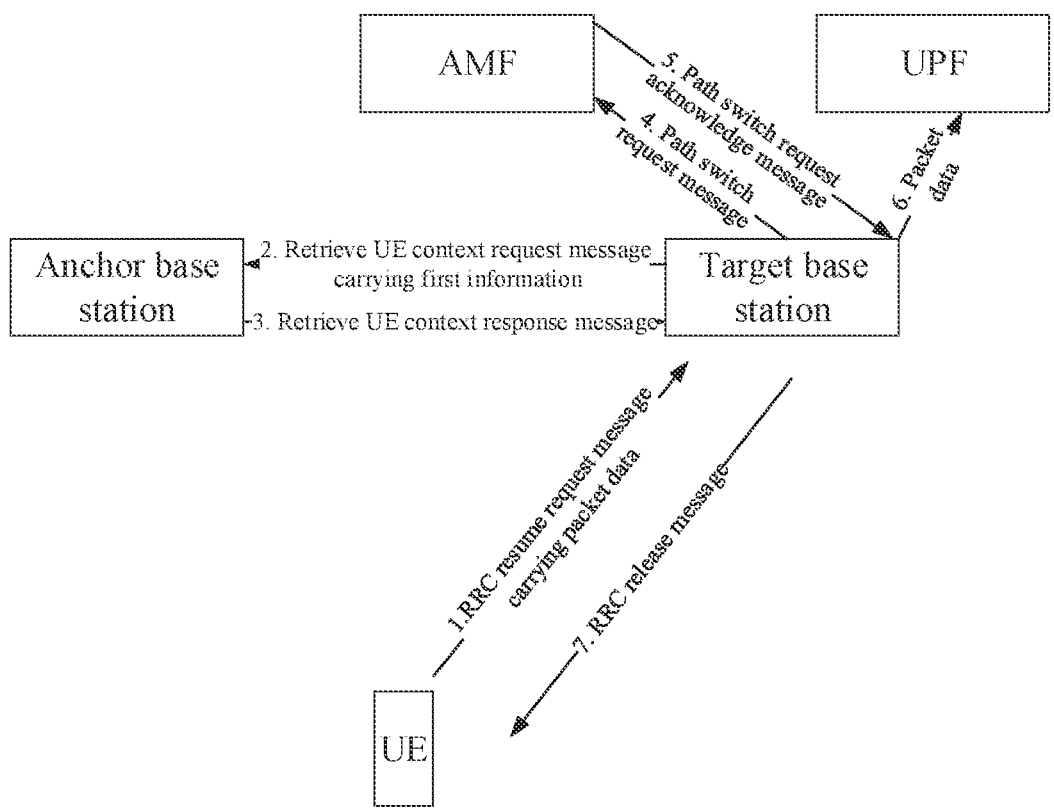
FIG. 5A illustrates a first schematic diagram of packet data transmission with context transfer according to an embodiment of the disclosure.

FIG. 5A illustrates a flowchart of packet data transmission with context transfer according to an embodiment of the disclosure, including the following operations.

1. A UE sends an RRC resume request message to a target base station, the RRC resume request message carrying packet data.

Herein, the UE may send the RRC resume request message to the target base station to trigger a RRC connection resume procedure.

The RRC resume request message may include a container or a payload, the container or the payload may carry packet data to be transmitted and may further include bearer configuration information corresponding to the packet data. For example, the packet data may be a PDCP PDU, and the bearer configuration information may be a LCID and/or a DRB ID corresponding to the packet data.

After receiving the RRC resume request message, the target base station may decode the message (in a specific implementation, after receiving a MAC PDU corresponding to the RRC resume request message, the target base station may decode the MAC PDU), and acquire from the RRC resume request message a UE identifier, i.e., I-RNTI, as well as the container or payload carrying the packet data.

2. The target base station addresses an anchor base station according to the I-RNTI, and sends a retrieve UE context request message to the anchor base station. The retrieve UE context request message may carry auxiliary information about packet data transmission (i.e., first information) of the UE. The content in the first information may be implemented in any one or more of the following manners:

Manner 1, packet data transmission indication information (or EDT indication information), and/or a DRB ID associated with the packet data, and/or a LCID associated with the packet data;

Manner 2, a PDCP PDU corresponding to the packet data, and/or a DRB ID associated with the packet data, and/or a LCID associated with the packet data; and Manner 3, indication information about whether to send the context of the terminal device to the target base station, where the indication information may be determined based on a tendency or expectation of the target base station.

It should be noted that, when the packet data corresponding to multiple bearers is carried, the packet data corresponding to each bearer and the bearer configuration information corresponding to the packet data may be carried respectively.

3. The anchor base station determines whether to transfer a UE context. In response to the anchor station determining to transfer the UE context, the anchor base station may reply a retrieve UE context response message to the target base station, and the retrieve UE context response message may carry the UE context.

4. After receiving the UE context from the anchor base station, the target base station resumes the UE context, and transmits the packet data to a corresponding PDCP stratum for decryption and/or integrity verification according to the indicated LCID and/or DRB ID. The target base station sends a path switch request message to an AMF to trigger the AMF to perform path switching.

Herein, resuming the UE context may include, but is not limited to, resuming AS security, resuming DRB configuration, and resuming SRB configuration.

5. The target base station receives a path switch request acknowledge message from the AMF.

6. The target base station establishes a GTP tunnel between the target base station and a core network and sends the packet data to a UPF.

7. The target base station sends an RRC release message to the UE.

Figure 5B:
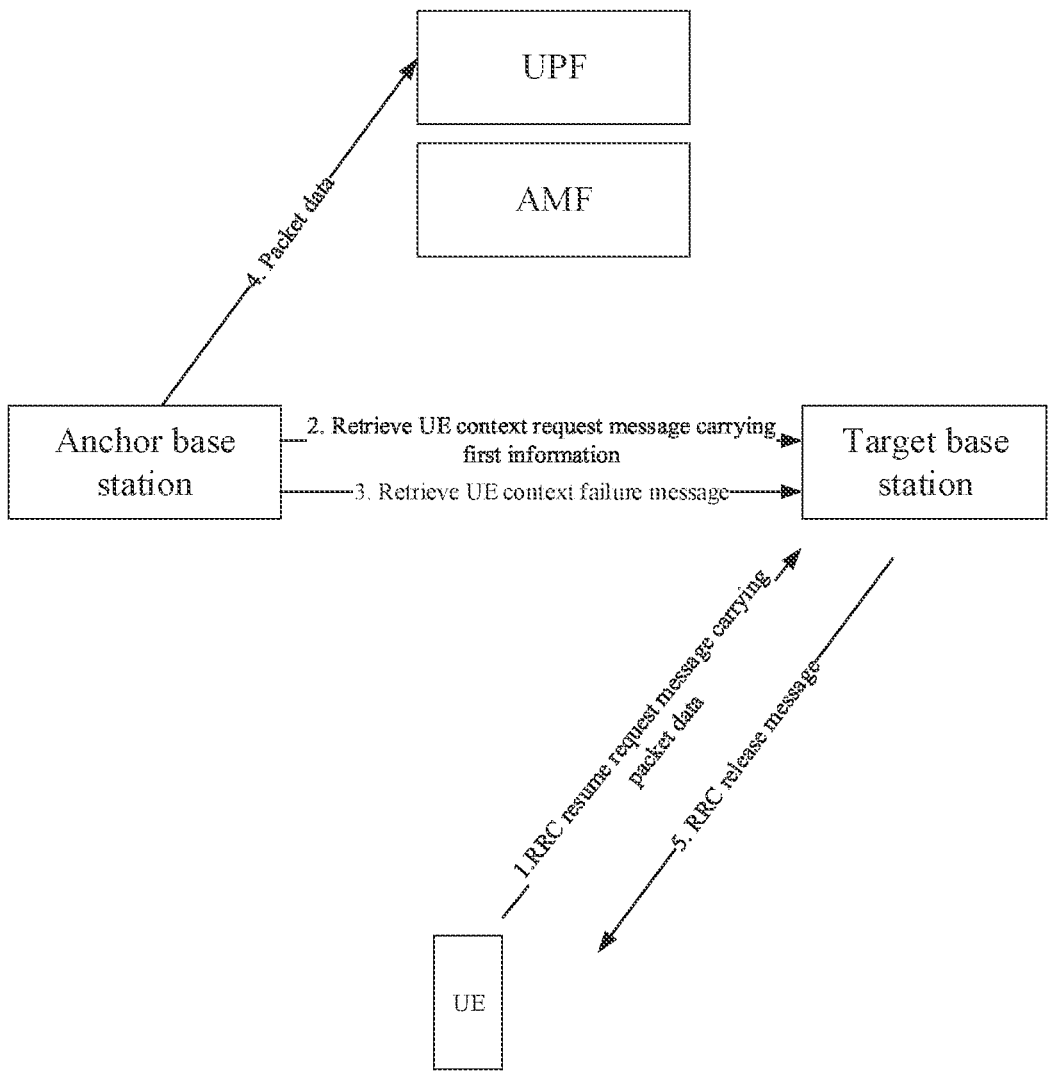
FIG. 5B illustrates a first schematic diagram of packet data transmission without context transfer according to an embodiment of the disclosure.

FIG. 5B illustrates a flowchart of packet data transmission without context transfer according to an embodiment of the disclosure, including the following operations.

1. A UE sends an RRC resume request message to a target base station, the RRC resume request message carrying packet data.

Herein, the UE sends the RRC resume request message to the target base station to trigger RRC connection resume.

The RRC resume request message may include a container or a payload. The container or the payload may carry the packet data to be transmitted and may further include bearer configuration information corresponding to the packet data. For example, the packet data may be a PDCP PDU, and the bearer configuration information may be a LCID and/or a DRB ID corresponding to the packet data.

After receiving the RRC resume request message, the target base station may decode the message (in a specific implementation, after receiving a MAC PDU corresponding to the RRC resume request message, the target base station decodes the MAC PDU), and acquire from the RRC resume request message a UE identifier, i.e., I-RNTI, and the container or payload carrying the packet data.

2. The target base station addresses an anchor base station according to the I-RNTI, and sends a retrieve UE context request message to the anchor base station. The retrieve UE context request message may carry auxiliary information about packet data transmission (i.e., first information) of the UE. The content in the first information may be implemented in any one or more of the following manners:

Manner 1: packet data transmission indication information (or EDT indication information), and/or DRB ID associated with the packet data, and/or LCID associated with the packet data;

Manner 2: a PDCP PDU corresponding to the packet data, and/or a DRB ID associated with the packet data, and/or a LCID associated with the packet data; and Manner 3: indication information about whether to send the context of the terminal device to the target base station, where the indication information may be determined based on a tendency or expectation of the target base station.

It should be noted that, when the packet data corresponding to multiple bearers is carried, the packet data corresponding to each bearer and the bearer configuration information corresponding to the packet data may be carried respectively.

3. The anchor base station determines whether to transfer a UE context. In response to the anchor base station determining not to transfer the UE context, the anchor base station may reply a retrieve UE context failure message to the target station.

Herein, if the manner 1 or the manner 3 is adopted in the operation 2, the anchor base station may establish a GTP tunnel from the target base station to the anchor base station through the retrieve UE context failure message, and the target base station may send the packet data to the anchor base station through the GTP tunnel. Further, when the packet data corresponds to N DRBs, N GTP tunnels may be established, and the N GTP tunnels correspond to the N DRBs one to one, and N is a positive integer. Meanwhile, the retrieve UE context failure message may carry an RRC release message.

4. The anchor base station resumes the UE context, transmits the packet data to a corresponding PDCP stratum for decryption and/or integrity verification, and finally sends the packet data to a UPF.

5. After receiving the retrieve UE context failure message from the anchor base station, the target base station acquires the RRC release message from the retrieve UE context failure message and sends the RRC release message to the UE.

Figure 6:
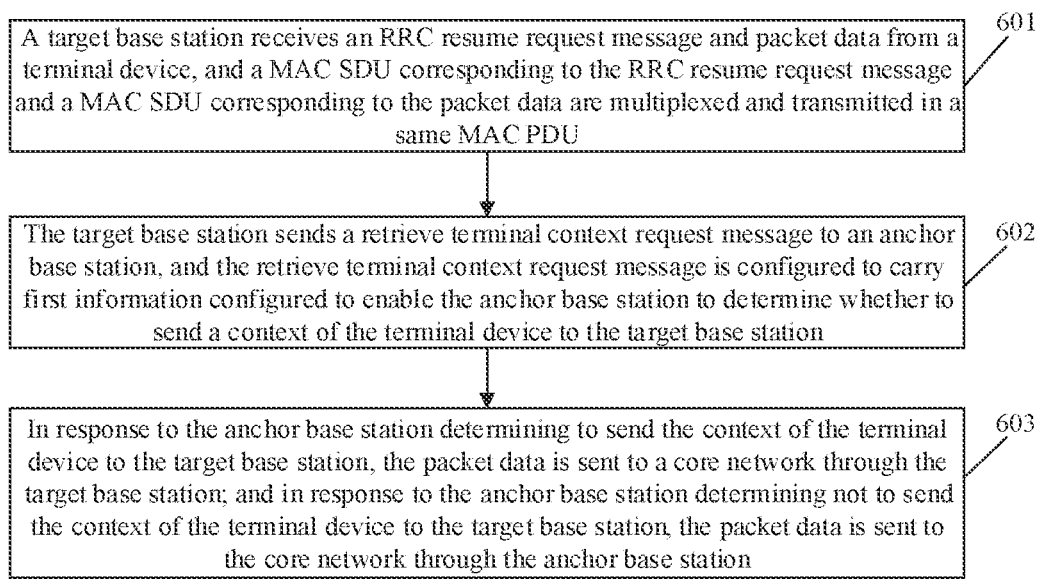
FIG. 6 illustrates a second schematic flowchart of a data transmission method according to an embodiment of the disclosure.

FIG. 6 illustrates a second schematic flowchart of a data transmission method according to an embodiment of the disclosure. As shown in FIG. 6, the data transmission method may include the following operations.

Operation 601 includes that: a target base station receives an RRC resume request message and packet data from a terminal device, and a MAC SDU corresponding to the RRC resume request message and a MAC SDU corresponding to the packet data are multiplexed and transmitted in a same MAC PDU.

According to the embodiment of the disclosure, the terminal device may be any device capable of communicating with network, such as a mobile phone, a tablet computer, a notebook computer, a vehicle-mounted termina, a wearable device, etc. In an optional implementation, a terminal device may be in an inactive state.

According to the embodiment of the disclosure, a user plane transmission scheme is adopted to transmit the RRC resume request message and the packet data. The RRC resume request message may be transmitted through a CCCH, and the packet data may be transmitted through a DTCH. The MAC SDU corresponding to the packet data (i.e., DTCH SDU) and the MAC SDU corresponding to the RRC resume request message (i.e., CCCH SDU) may be multiplexed in the same MAC PDU in a MAC stratum.

According to some optional implementations of the disclosure, an RRC resume request message may further carry first indication information configured to indicate that a RRC connection resume procedure is triggered to transmit the packet data.

According to the embodiment of the disclosure, the packet data is also called as small data or small data packet or EDT data.

Operation 602 includes that: the target base station sends a retrieve terminal context request message to an anchor base station, and the retrieve terminal context request message is configured to carry first information configured to enable the anchor base station to determine whether to send a context of the terminal device to the target base station.

According to the embodiment of the disclosure, the target base station may acquire a first terminal identifier from the RRC resume request message, address the anchor base station according to the first terminal identifier, and send the retrieve terminal context request message to the anchor base station. Herein, the first terminal identifier may be an I-RNTI.

According to the embodiment of the disclosure, the first information carried in the retrieve terminal context request message may serve as auxiliary information to enable the anchor base station to determine whether to send the context of the terminal device to the target base station. The first information carried in the retrieve terminal context request message may be implemented in the following manners that:

1) the first information carried in the retrieve terminal context request message may include at least one of the following: packet data transmission indication information, bearer configuration information corresponding to the packet data; or, 2) the first information carried in the retrieve terminal context request message may include at least one of the following: the packet data, bearer configuration information corresponding to the packet data; or, 3) the first information carried in the retrieve terminal context request message may include at least one of the following: indication information about whether to send the context of the terminal device to the target base station.

It should be noted that the above 1), 2) and 3) may be implemented alone or in combination. For example, the first information carried in the retrieve terminal context request message may include at least one of the following: packet data transmission indication information, bearer configuration information corresponding to the packet data, and indication information about whether to send the context of the terminal device to the target base station; and for example, the first information carried in the retrieve terminal context request message may include at least one of the following: the packet data, bearer configuration information corresponding to the packet data, and indication information about whether to send the context of the terminal device to the target base station.

Herein, the bearer configuration information may include at least one of the following: a LCID, and a DRB ID.

It should be noted that, when the RRC resume request message carries packet data corresponding to multiple bearers, the packet data corresponding to each bearer and the bearer configuration information corresponding to the packet data may be carried respectively. The foregoing merely illustrates a case in which the packet data corresponding to one bearer is transmitted.

Operation 603 includes that: in response to the anchor base station determining to send the context of the terminal device to the target base station, the packet data is sent to a core network through the target base station; and in response to the anchor base station determining not to send the context of the terminal device to the target base station, the packet data is sent to the core network through the anchor base station.

According to the embodiment of the disclosure, the anchor base station refers to a base station having stored the terminal context. In an example, the anchor base station may be a base station serving the terminal device last time.

The transmission of the packet data will be illustrated in detail below with reference to specific context transfer conditions.

In a case that the anchor base station determines to send the context of the terminal device to the target base station, 1) the target base station may receive a retrieve terminal context response message from the anchor base station, and the retrieve terminal context response message may carry the context of the terminal device; 2) the target base station may resume the context of the terminal device, and transmit the data packet to a PDCP stratum for decryption and/or integrity verification according to the bearer configuration information corresponding to the packet data; and 3) the target base station may trigger a core network control plane network element to perform path switching, establish a GTP tunnel between the target base station and a core network user plane network element after receiving a path switch acknowledge message from the core network control plane network element, and send the packet data to the core network user plane network element through the GTP tunnel.

Herein, the core network control plane network element may be an AMF, and the core network user plane network element may be a UPF.

In a case that the anchor base station determines not to send the context of the terminal device to the target base station.

1) the target base station may receive a retrieve terminal context failure message from the anchor base station, and the retrieve terminal context failure message may carry GTP tunnel information configured by the anchor base station; 2) the target base station may send the packet data to the anchor base station through a GTP tunnel based on the GTP tunnel information; and 3) the anchor base station may resume the context of the terminal device, transmits the data packet to the PDCP stratum for decryption and/or integrity verification according to the bearer configuration information corresponding to the packet data, and then send the data packet to a core network user plane network element.

Herein, the core network control plane network element may be an AMF, and the core network user plane network element may be a UPF.

Herein, the GTP tunnel information configured by the anchor base station may include at least one of the following: a TEID corresponding to the GTP tunnel and bearer configuration information associated with the GTP tunnel. Further, the bearer configuration information may include at least one of the following: a LCID, and a DRB ID.

It should be noted that, the packet data according to the embodiment of the disclosure may be packet data corresponding to one or more DRBs. When the packet data may include packet data corresponding to a DRB, the GTP tunnel information configured by the anchor base station may include GTP tunnel information corresponding to the DRB; and when the packet data may include packet data corresponding to multiple DRBs, the GTP tunnel information configured by the anchor base station may include GTP tunnel information respectively corresponding to the multiple DRBs.

In an alternative implementation, a retrieve terminal context failure message may carry an RRC release message. After receiving the retrieve terminal context failure message from an anchor base station, the target base station may acquire the RRC release message from the retrieve terminal context failure message and send the RRC release message to the terminal device.

The technical scheme of the embodiments of the disclosure will be illustrated below with reference to FIG. 7A and FIG. 7B.

Figure 7A:
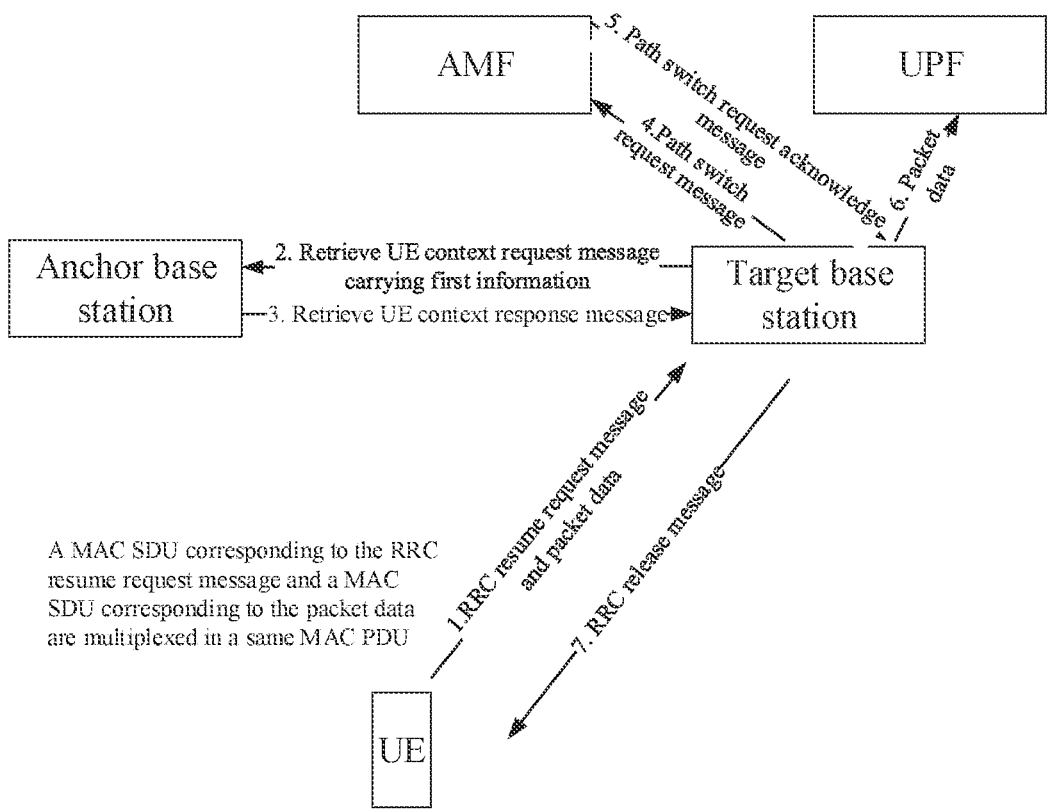
FIG. 7A illustrates a second schematic diagram of packet data transmission with context transfer according to an embodiment of the disclosure.

FIG. 7A illustrates a flowchart of packet data transmission with context transfer according to an embodiment of the disclosure, including the following operations.

1. A UE sends an RRC resume request message and packet data to a target base station, and a MAC SDU corresponding to the RRC resume request message and a MAC SDU corresponding to the packet data are multiplexed in a same MAC PDU.

Herein, a UE non-access stratum (NAS) may trigger RRC to initiate a RRC connection resume procedure and send the packet data simultaneously. Specifically, the RRC resume request message may be transmitted through a CCCH, and the packet data may be transmitted through a DTCH. The MAC SDU (i.e., DTCH SDU) corresponding to the packet data and the MAC SDU (i.e., CCCH SDU) corresponding to the RRC resume request message may multiplexed in the same MAC PDU in a MAC stratum.

Then, the CCCH SDU is required to be decoded first, therefore the CCCH SDU is required to be ahead of the DTCH SDU in the MAC PDU.

Alternatively, in order to enable the target base station to know that the MAC SDU corresponding to the packet data and the MAC SDU corresponding to the RRC connection resume request message are multiplexed and transmitted in the same MAC PDU in the MAC stratum, the RRC resume request message is required to carry first indication information configured to indicate that the RRC connection resume is triggered to transmit the packet data.

2. The target base station addresses an anchor base station according to the I-RNTI, and sends a retrieve UE context request message to the anchor base station. The retrieve UE context request message may carry auxiliary information about packet data transmission (i.e., the first information) of the UE. The content in the first information may be implemented in any one or more of the following manners:

Manner 1: packet data transmission indication information (or EDT indication information), and/or a DRB ID associated with the packet data, and/or a LCID associated with the packet data;

Manner 2: a PDCP PDU corresponding to the packet data, and/or a DRB ID associated with the packet data, and/or a LCID associated with the packet data;

Manner 3: indication information about whether to send the context of the terminal device to the target base station, where the indication information may be determined based on the tendency or expectation of the target base station.

It should be noted that, when the packet data corresponding multiple bearers is carried, the packet data corresponding to each bearer and the bearer configuration information corresponding to the packet data may be carried respectively.

3. The anchor base station determines whether to transfer a UE context. When the anchor base station determines to transfer the UE context, the anchor base station may reply a retrieve UE context response message to the target base station, and the retrieve UE context response message is configured to carry the UE context.

4. After receiving the UE context from the anchor base station, the target base station resumes the UE context, and transmits the packet data to a corresponding PDCP stratum for decryption and/or integrity verification according to the indicated LCID and/or DRB ID. The target base station sends a path switch request message to an AMF to trigger the AMF to perform path switching.

Herein, resuming the UE context may include, but is not limited to, resuming security, resuming DRB configuration, and resuming SRB configuration.

5. The target base station receives a path switch request acknowledge message from the AMF.

6. The target base station establishes a GTP tunnel between the target base station and a core network and sends the packet data to the UPF.

7. The target base station sends an RRC release message to the UE.

Figure 7B:
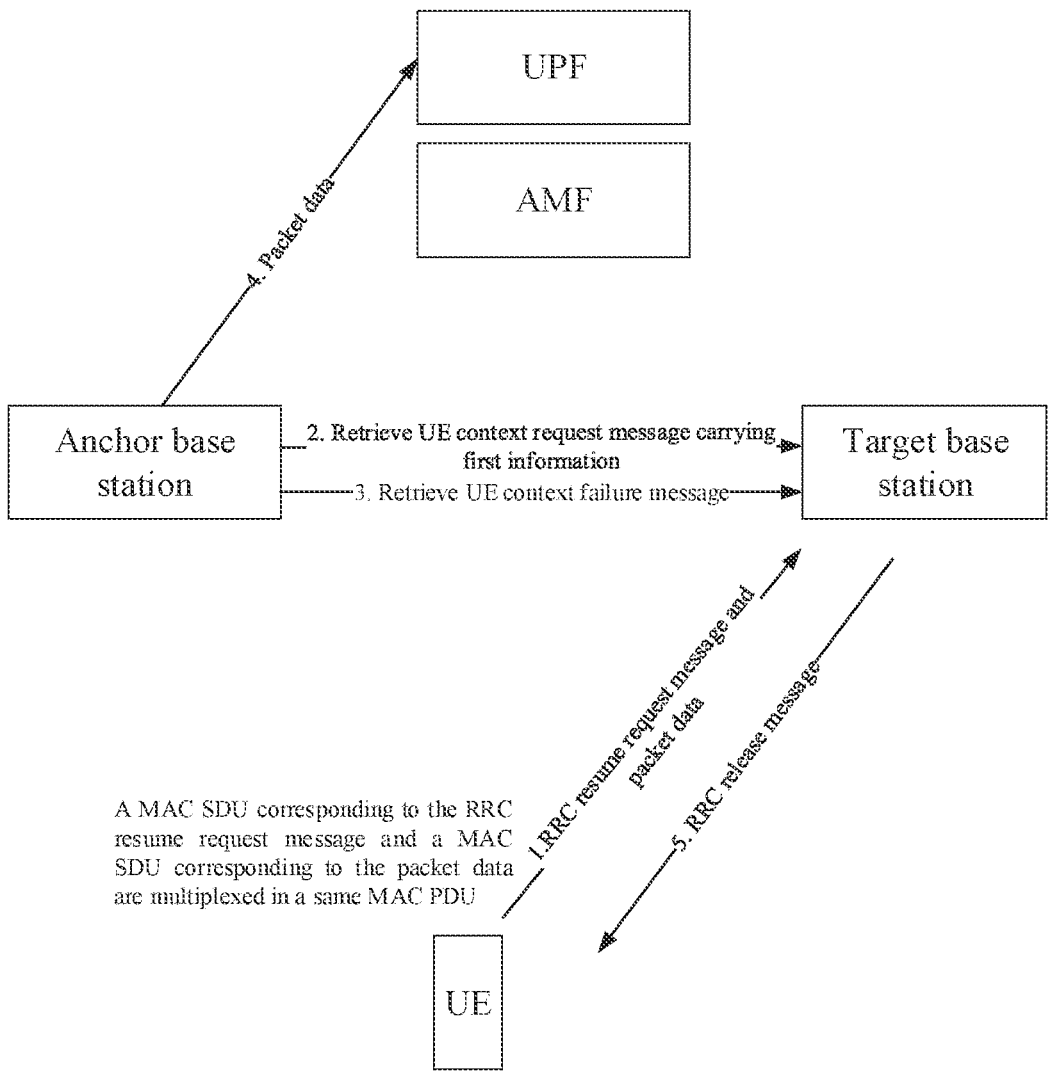
FIG. 7B illustrates a second schematic diagram of packet data transmission without context transfer according to an embodiment of the disclosure.

FIG. 7B illustrates a flowchart of packet data transmission without context transfer according to an embodiment of the disclosure, including the following operations.

1. A UE sends an RRC resume request message and packet data to a target base station, and a MAC SDU corresponding to the RRC resume request message and a MAC SDU corresponding to the packet data are multiplexed in a same MAC PDU.

Herein, a UE non-access stratum (NAS) may trigger RRC to initiate a RRC connection resume procedure and send the packet data simultaneously. Specifically, the RRC resume request message may be transmitted through a CCCH, and the packet data may be transmitted through a DTCH. The MAC SDU (i.e., DTCH SDU) corresponding to the packet data and the MAC SDU (i.e., CCCH SDU) corresponding to the RRC resume request message may be multiplexed in the same MAC PDU in a MAC stratum.

Then, the CCCH SDU is required to be decoded first, therefore the CCCH SDU is required to be ahead of the DTCH SDU in the MAC PDU.

Alternatively, in order to enable the target base station to know that the MAC SDU corresponding to the packet data and the MAC SDU corresponding to the RRC resume request message are multiplexed and transmitted in the same MAC PDU in the MAC stratum, the RRC resume request message is required to carry first indication information configured to indicate that the RRC connection resume is triggered to transmit the packet data.

2. The target base station addresses an anchor base station according to the I-RNTI, and sends a retrieve UE context request message to the anchor base station. The retrieve UE context request message is configured to carry auxiliary information about packet data transmission (i.e., first information) of the UE. The content in the first information may be implemented in any one or more of the following manners:

Manner 1: packet data transmission indication information (or EDT indication information), and/or DRB ID associated with the packet data, and/or LCID associated with the packet data;

Manner 2: a PDCP PDU corresponding to the packet data, and/or a DRB ID associated with the packet data, and/or a LCID associated with the packet data; and Manner 3: indication information about whether to send the context of the terminal device to the target base station, where the indication information may be determined based on the tendency or expectation of the target base station.

It should be noted that, when the packet data corresponding to multiple bearers is carried, the packet data corresponding to each bearer and the bearer configuration information corresponding to the packet data may be carried respectively.

3. The anchor base station determines whether to transfer a UE context. When the anchor base station determines not to transfer the UE context, the anchor base station may reply a retrieve UE context failure message to the target base station.

Herein, if manner 1 or manner 3 is adopted in the operation 2, the anchor base station may establish a GTP tunnel from the target base station to the anchor base station through the retrieve UE context failure message, and the target base station may transmit the packet data to the anchor base station through the GTP tunnel. Further, when the transmitted packet data corresponds to N DRBs, N GTP tunnels may be established, and the N GTP tunnels correspond to the N DRBs one to one, and N is a positive integer. Meanwhile, the retrieve UE context failure message may carry an RRC release message.

4. The anchor base station resumes the UE context, transmits the packet data to a corresponding PDCP stratum for decryption and/or integrity verification, and finally sends the packet data to a UPF.

5. After receiving the retrieve UE context failure message from the anchor base station, the target base station acquires the RRC release message from the retrieve UE context failure message and sends the RRC release message to the UE.

Figure 8:
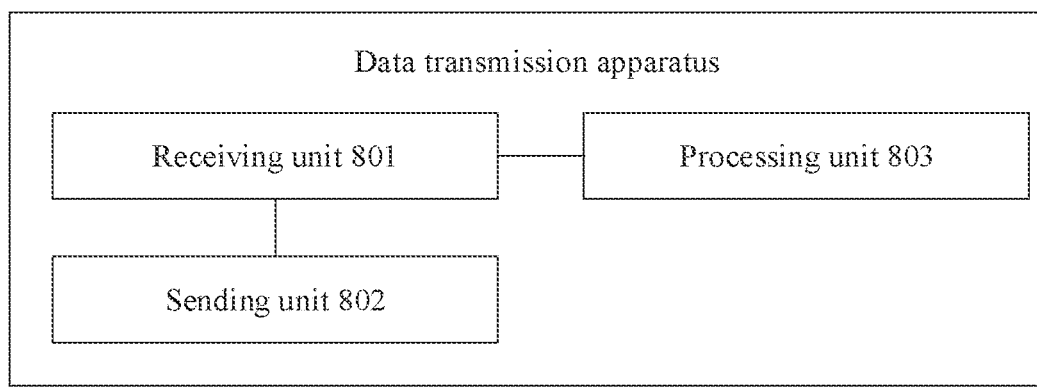
FIG. 8 illustrates a first schematic structural diagram of a data transmission apparatus according to an embodiment of the disclosure.

FIG. 8 illustrates a schematic structural diagram of a data transmission apparatus according to an embodiment of the disclosure. As shown in FIG. 8, the data transmission apparatus may include:

a receiving unit 801, configured to receive an RRC resume request message from a terminal device, the RRC resume request message being configured to carry packet data; and to acquire the packet data from the RRC resume request message; and a sending unit 802, configured to send a retrieve terminal context request message to an anchor base station, the retrieve terminal context request message being configured to carry first information configured to enable the anchor base station to determine whether to send a context of the terminal device to the target base station.

In response to the anchor base station determining to send the context of the terminal device to the target base station, the packet data may be sent to a core network through the target base station; and in response to the anchor base station determining not to send the context of the terminal device to the target base station, the packet data may be sent to the core network through the anchor base station.

In an implementation, the RRC resume request message being configured to carry the packet data, may include:

the RRC resume request message including a first container configured to carry packet data or, the RRC resume request message including a first payload configured to carry the packet data.

In an implementation, an RRC resume request message is further configured to carry bearer configuration information corresponding to the packet data.

In an implementation, the sending unit 802 is configured to acquire a first terminal identifier from an RRC resume request message, address an anchor base station according to the first terminal identifier, and send a retrieve terminal context request message to the anchor base station.

In an implementation, first information carried in the retrieve terminal context request message may include at least one of the following:

packet data transmission indication information, and the bearer configuration information corresponding to the packet data.

In an implementation, first information carried in the retrieve terminal context request message may include at least one of the following:

the packet data, and bearer configuration information corresponding to the packet data.

In an implementation, first information carried in the retrieve terminal context request message may include at least one of the following:

indication information about whether to send a context of the terminal device to a target base station.

In an implementation, when the anchor base station determines to send a context of the terminal device to a target base station, a receiving unit 801 is configured to receive a retrieve terminal context response message from the anchor base station, and the retrieve terminal context response message is configured to carry the terminal context.

The apparatus may further include a processing unit 803, configured to resume the context of the terminal device and transmit the data packet to a PDCP stratum for decryption and/or integrity verification according to the bearer configuration information corresponding to the packet data and to trigger a core network control plane network element to perform path switching, to establish a GTP tunnel between the core network control plane network element and a core network user plane network element after receiving a path switch acknowledge message from the core network control plane network element, and to send the packet data to the core network user plane network element through the GTP tunnel.

In an implementation, when the anchor base station determines not to send a context of the terminal device to a target base station, a receiving unit 801 is configured to receive a retrieve terminal context failure message from the anchor base station, and the retrieve terminal context failure message is configured to carry GTP tunnel information configured by the anchor base station.

A sending unit 802 is configured to send the packet data to the anchor base station through a GTP tunnel based on the GTP tunnel information; and the anchor base station may resume the context of the terminal device, transmit the data packet to a PDCP stratum for decryption and/or integrity verification according to bearer configuration information corresponding to the packet data, and then send the data packet to a core network user plane network element.

In an implementation, GTP tunnel information configured by an anchor base station may include at least one of the following: a TEID corresponding to a GTP tunnel, and bearer configuration information associated with the GTP tunnel.

In an implementation, when packet data may include packet data corresponding to a DRB. GTP tunnel information configured by an anchor base station may include GTP tunnel information corresponding to the DRB.

When the packet data includes packet data corresponding to multiple DRBs, the GTP tunnel information configured by the anchor base station may include GTP tunnel information corresponding to the multiple DRBs respectively.

In an implementation, a retrieve terminal context failure message is further configured to carry an RRC release message.

A sending unit 802 is configured to acquire the RRC release from the retrieve terminal context failure message and send the RRC release message to the terminal device.

In an implementation, bearer configuration information may include at least one of the following: a LCID, and a DRB ID.

Those skilled in the art should understand that the foregoing description of the data transmission apparatus according to the embodiments of the disclosure may be understood with reference to the description of a data transmission method according to an embodiment of the disclosure.

Figure 9:
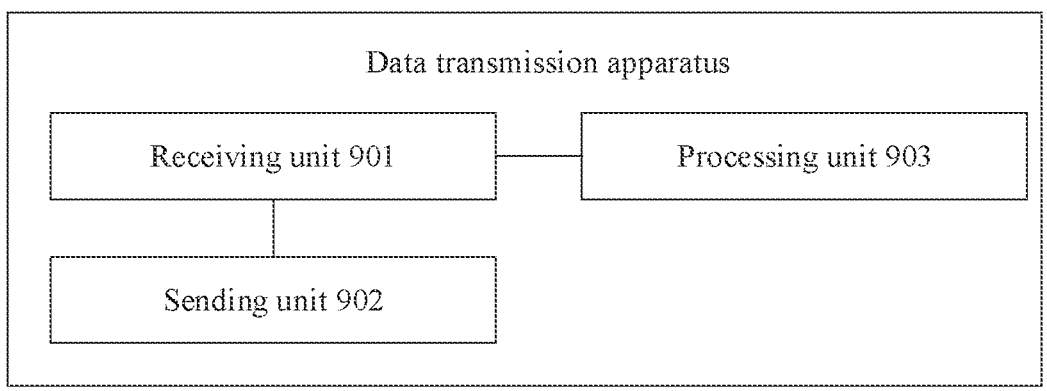
FIG. 9 illustrates a second schematic structural diagram of a data transmission apparatus according to an embodiment of the disclosure.

FIG. 9 illustrates a second schematic structural diagram of a data transmission apparatus according to an embodiment of the disclosure. As shown in FIG. 9, the data transmission apparatus may include:

a receiving unit 901, configured to receive an RRC resume request message and packet data from a terminal device, and a MAC SDU corresponding to the RRC resume request message and a MAC SDU corresponding to the packet data being multiplexed and transmitted in a same MAC PDU;

a sending unit 902, configured to send a retrieve terminal context request message to an anchor base station, the retrieve terminal context request message being configured to carry first information configured to enable the anchor base station to determine whether to send a context of the terminal device to a target base station.

In response to the anchor base station determining to send the context of the terminal device to the target base station, the packet data may be sent to a core network through the target base station; and in response to the anchor base station determining not to send the context of the terminal device to the target base station, the packet data may be sent to the core network through the anchor base station.

In an implementation, an RRC resume request message may be transmitted through a CCCH, and packet data may be transmitted through a DTCH.

In an implementation, an RRC resume request message may carry first indication information configured to indicate that RRC connection resume is triggered to transmit packet data.

In an implementation, a sending unit 902 is configured to acquire a first terminal identifier from an RRC resume request message, address an anchor base station according to the first terminal identifier, and send a retrieve terminal context request message to the anchor base station.

In an implementation, first information carried in a retrieve terminal context request message may include at least one of the following:

packet data transmission indication information, and the bearer configuration information corresponding to packet data.

In an implementation, first information carried in a retrieve terminal context request message may include at least one of the following:

the packet data, and bearer configuration information corresponding to the packet data.

In an implementation, first information carried in a retrieve terminal context request message may include at least one of the following:

indication information about whether to send the context of the terminal device to the target base station.

In an implementation, in response to an anchor base station determining to send the context of the terminal device to the target base station, a receiving unit 901 is configured to receive a retrieve terminal context response message from the anchor base station, the retrieve terminal context response message being configured to carry the terminal context.

The apparatus may further include a processing unit 903, configured to resume the context of the terminal device and transmit the data packet to a PDCP stratum for decryption and/or integrity verification according to bearer configuration information corresponding to the packet data; and to trigger a core network control plane network element to perform path switching, establish a GTP tunnel between the core network control plane network element and a core network user plane network element after receiving a path switch acknowledge message from the core network control plane network element, and send the packet data to the core network user plane network element through the GTP tunnel.

In an implementation, in response to an anchor base station determining not to send a context of the terminal device to a target base station, a receiving unit 901 is configured to receive a retrieve terminal context failure message from the anchor base station, the retrieve terminal context failure message being configured to carry GTP tunnel information configured by the anchor base station.

The sending unit 902 is configured to send the packet data to the anchor base station through a GTP tunnel based on the GTP tunnel information. The anchor base station may resume the context of the terminal device, transmit the data packet to a PDCP stratum for decryption and/or integrity verification according to the bearer configuration information corresponding to the packet data, and then send the data packet to the core network user plane network element.

In an implementation. GTP tunnel information configured by an anchor base station may include at least one of the following: a TEID corresponding to a GTP tunnel, and bearer configuration information associated with the GTP tunnel.

In an implementation, when the packet data includes packet data corresponding to a DRB, GTP tunnel information configured by the anchor base station may include GTP tunnel information corresponding to the DRB.

When the packet data includes packet data corresponding to multiple DRBs, the GTP tunnel information configured by the anchor base station may include GTP tunnel information corresponding to the multiple DRBs respectively.

In an implementation, the retrieve terminal context failure message may carry an RRC release message.

The sending unit 902 is configured to acquire the RRC release message from the retrieve terminal context failure message and send the RRC release message to a terminal device.

In an implementation, bearer configuration information may include at least one of the following: a LCID, and a DRB ID.

Those skilled in the art should understand that the foregoing description of the data transmission apparatus according to the embodiments of the disclosure may be understood with reference to the description of a data transmission method according to an embodiment of the disclosure.

Figure 10:
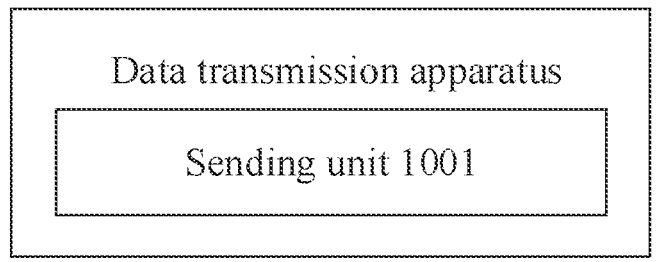
FIG. 10 illustrates a third schematic structural diagram of a data transmission apparatus according to an embodiment of the disclosure.

FIG. 10 illustrates a third schematic structural diagram of a data transmission apparatus according to an embodiment of the disclosure. As shown in FIG. 10, the data transmission apparatus may include:

a sending unit 1001, configured to send an RRC resume request message to a target base station, the RRC resume request message being configured to carry packet data.

In an implementation, an RRC resume request message being configured to carry packet data, may include:

the RRC resume request message including a first container configured to carry the packet data; or, the RRC resume request message including a first payload configured to carry the packet data.

In an implementation, an RRC resume request message may carry bearer configuration information corresponding to packet data.

In an implementation, bearer configuration information may include at least one of the following: a LCID, and a DRB ID.

Those skilled in the art should understand that, the foregoing description of the data transmission apparatus according to the embodiments of the disclosure may be understood with reference to the description of a data transmission method according to an embodiment of the disclosure.

Figure 11:
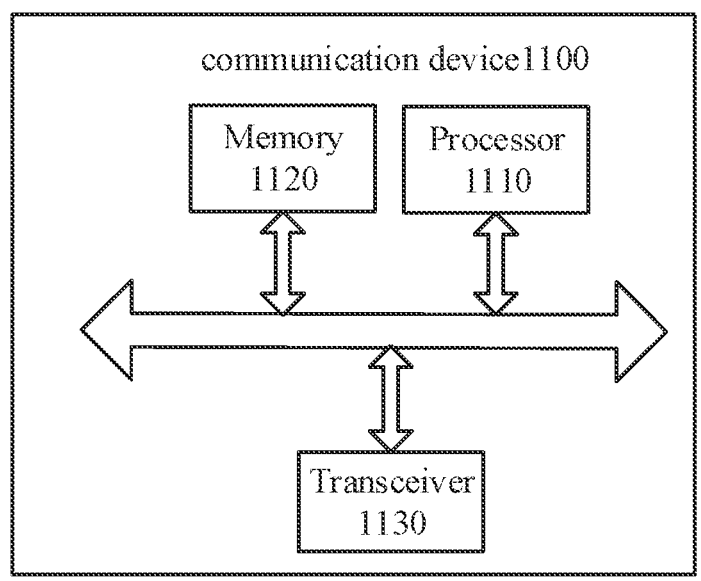
FIG. 11 illustrates a schematic structural diagram of a communication device according to an embodiment of the disclosure.

FIG. 11 illustrates a schematic structural diagram of a communication device 1100 according to an embodiment of the disclosure. The communication device may be a terminal device or a network device. As shown in FIG. 11, the communication device 1100 may include a processor 1210 which may call and run a computer program from a memory to implement a data transmission method according to an embodiment of the disclosure.

Alternatively, as shown in FIG. 11, the communication device 1100 may further include a memory 1220. The processor 1210 may call and run the computer program from the memory 1220 to implement a data transmission method according an embodiment of the disclosure.

The memory 1220 may be a device independent of the processor 1210 or may be integrated in the processor 1210.

Alternatively, as shown in FIG. 11, the communication device 1100 may further include a transceiver 1130, the processor 1210 may control the transceiver 1130 to communicate with other devices, and specifically, to transmit information or data to other devices or receive information or data sent by other devices.

The transceiver 1130 may include a transmitter and a receiver. The transceiver 1130 may further include antennas, the number of which may be one or more.

Alternatively, the communication device 1100 may be specifically a communication device according to an embodiment of the disclosure, and the communication device 1100 may implement corresponding processes implemented by a communication device in a data transmission method according to an embodiment of the disclosure, which will not be repeated herein.

Alternatively, the communication device 1100 may be specifically a mobile terminal/a terminal device according to an embodiment of the disclosure, and the communication device 1100 may implement corresponding processes implemented by a mobile terminal/a terminal device in a data transmission method according to an embodiment of the disclosure, which will not be repeated herein.

Figure 12:
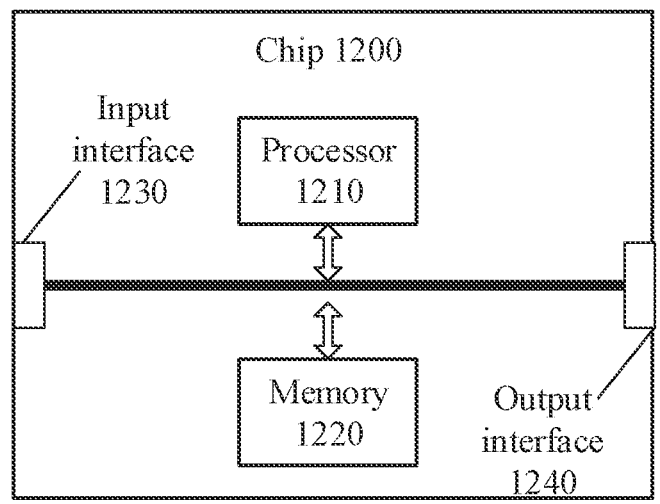
FIG. 12 illustrates a schematic structural diagram of a chip according to an embodiment of the disclosure.

FIG. 12 illustrates a schematic structural diagram of a chip according to an embodiment of the disclosure. As shown in FIG. 12, the chip 1200 may include a processor 1210 which may call and run a computer program from a memory to implement a data transmission method according to an embodiment of the disclosure.

Alternatively, as shown in FIG. 12, the chip 1200 may further include a memory 1220. The processor 1210 may call and run the computer program from the memory 1220 to implement a data transmission method according to an embodiment of the disclosure.

The memory 1220 may be a device independent of the processor 1210 or may be integrated in the processor 1210.

Alternatively, the chip 1200 may further include an input interface 1230. The processor 1210 may control the input interface 1230 to communicate with other devices or chips, and specifically, to acquire information or data sent by other devices or chips.

Alternatively, the chip 1200 may further include an output interface 1240. The processor 1210 may control the output interface 1240 to communicate with other devices or chips, and specifically, to output information or data to other devices or chips.

Alternatively, the chip may be applied to a communication device according to an embodiment of the disclosure, and the chip may implement corresponding processes implemented by a communication device in a data transmission method according to an embodiment of the disclosure, which will not be repeated herein.

Alternatively, the chip may be applied to a mobile terminal/a terminal device according to an embodiment of the disclosure, and the chip may implement the corresponding processes implemented by a mobile terminal/a terminal device in a data transmission method according to an embodiment of the disclosure, which will not be repeated herein.

It should be understood that, the chip according to the embodiment of the disclosure may further be known as system-on-chip.

Figure 13:
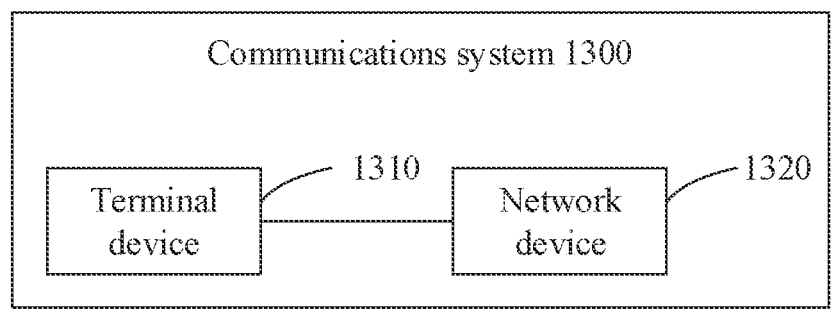
FIG. 13 illustrates a schematic block diagram of a communication system according to an embodiment of the disclosure.

FIG. 13 illustrates a schematic block diagram of a communication system 1300 according to an embodiment of the disclosure. As shown in FIG. 13, the communication system 1300 may include a terminal device 1310 and a network device 1320.

The terminal device 1310 may be configured to implement the corresponding functions implemented by the terminal device in the data transmission method, and the network device 1320 may be configured to implement the corresponding functions implemented by the network device in the data transmission method, which will not repeated herein.

It should be understood that, a processor according to an embodiment of the disclosure may be an integrated circuit chip with a signal processing capacity. In implementation, the operations of a data transmission method according to an embodiment of the disclosure may be implemented by an integrated logic circuit of hardware in the processor or instructions in the form of software. The processor may be a general purpose processor, DSP (Digital Signal Processor), ASIC (Application Specific Integrated Circuit), FPGA (Field Programmable Gate Array) or other programmable logic devices, discrete gates or transistor logic devices, or discrete hardware components. A data transmission method, operation and logic block diagram according to an embodiment of the disclosure may be implemented or executed by the processor. The general purpose processor may be a microprocessor or the processor may be any conventional processor. The operations of a data transmission method according to an embodiment of the disclosure may be directly implemented by hardware decoding processor or by hardware and software modules in the decoding processor. The software modules may be positioned in RAM (Random Access Memory), flash memory, ROM (Read-Only Memory), PROM (Programmable ROM) or EEPROM (Electrically Erasable EPROM), registers and other storage media developed in the art. The storage medium is positioned in the memory, and the processor reads the information in the memory and completes the operations of a data transmission method in combination with hardware thereof.

It should be understood that, the memory according to the embodiments of the disclosure may be a volatile memory or non-volatile memory or may include both the volatile and non-volatile memory. The non-volatile memory may be ROM (Read-Only Memory), PROM (Programmable ROM), EPROM (Erasable PROM), EEPROM (Electrically Erasable EPROM), or flash memory. The volatile memory may be RAM (Random Access Memory) which serves as an external cache. For illustration but not limitation, many forms of RAM are available, such as SRAM (Static RAM), DRAM (Dynamic RAM), SDRAM (Synchronous DRAM), DDR SDRAM (Double Data Rate SDRAM). ESDRAM (Enhanced SDRAM), SLDRAM (Synchlink DRAM), and DR RAM (Direct Rambus RAM). It should be noted that, the memory in a systems or method described herein is intended to include but not limited to these and any other suitable types of memory.

It should be understood that the memory described above is merely illustrative and is not intended to limit the disclosure. For example, the memory according to the embodiments of the disclosure may further be SRAM (static RAM), DRAM (dynamic RAM), SDRAM (synchronous DRAM), DDR SDRAM (double data rate SDRAM), ESDRAM (enhanced SDRAM), SLDRAM (synch link DRAM), DR RAM (Direct Rambus RAM), etc. That is, the memory according to the embodiments of the disclosure is intended to include but not limited to these and any other suitable types of memory.

An embodiment of the disclosure further provides a computer-readable storage medium configured to store a computer program.

Alternatively, the computer-readable storage medium may be applied to a network device according to an embodiment of the disclosure, and the computer program enables a computer to execute the corresponding processes implemented by a network device in a data transmission method according to an embodiment of the disclosure, which will not be repeated herein.

Alternatively, the computer-readable storage medium may be applied to a mobile terminal/a terminal device according to an embodiment of the disclosure, and the computer program enables a computer to execute corresponding processes implemented by a mobile terminal/a terminal device in a data transmission method according to an embodiment of the disclosure, which will not be repeated herein.

An embodiment of the disclosure further provides a computer program product, including computer program instructions.

Alternatively, the computer program product may be applied to a network device according to an embodiment of the disclosure, and the computer program instructions enable a computer to execute the corresponding processes implemented by a network device in a data transmission method according to an embodiment of the disclosure, which will not be repeated herein.

Alternatively, the computer program product may be applied to a mobile terminal/a terminal device according to an embodiment of the disclosure, and the computer program instructions enable a computer to execute the corresponding processes implemented by a mobile terminal/a terminal device in a data transmission method according to an embodiment of the disclosure, which will not be repeated herein.

An embodiment of the disclosure further provides a computer program.

Alternatively, the computer program may be applied to a network device according to an embodiment of the disclosure, and when the computer program is run on a computer, the computer executes the corresponding processes implemented by a network device in a data transmission method according to an embodiment of the disclosure, which will not be repeated herein.

Alternatively, the computer program may be applied to a mobile terminal/a terminal device according to an embodiment of the disclosure, and when the computer program is run on a computer, the computer executes the corresponding processes implemented by a mobile terminal/a terminal device in a data transmission method according to an embodiment of the disclosure, which will not be repeated herein.

Those of ordinary skill in the art should understand that, the illustrative units and algorithm operations described with reference to the embodiments disclosed herein may be implemented through electronic hardware or a combination of computer software and electronic hardware. Whether functions are implemented through hardware or software depends on the specific application and design constraints of the technical schemes. Those skilled in the art may use different methods for specifically different applications to implement the described functions, which should fall within the scope of the disclosure.

Those skilled in the art should understand that, for convenience and conciseness of the description, the specific processes of the foregoing systems, apparatuses and units may refer to the corresponding processes according to the embodiments for method and will not be repeated herein.

According to the embodiments of the disclosure, it should be understood that the disclosed system, apparatus and method may be implemented in another way. The foregoing embodiments for apparatus are merely illustrative, for example, the units are merely classified according to the logical functions thereof, and may be classified in another way in actual application; and for example, multiple units or components may be combined or integrated into another system, or some features may be ignored or not implemented. In addition, the "coupling" or "direct coupling" or "communication connection" shown or discussed herein may be "indirect coupling" or "indirect communication connection" through some interfaces, apparatus or units, which may be implemented in electrical, mechanical or other forms.

The units, illustrated as separate components, may or may not be physically separated, and the components displayed as units may or may not be physical units, i.e., the components may be positioned in one place, or may be distributed over multiple network units. Part or all of the units may be selected according to actual needs to achieve the objectives of the technical schemes according to the embodiments.

In addition, the functional units according to the embodiments of the disclosure may be integrated in one processing unit, or each unit may exist physically alone, or two or more units may be integrated in one unit.

The functions, if implemented in the form of software functional units and sold or utilized as a product alone, may be stored in a computer-readable storage medium. Thereon, the technical schemes of the embodiments of the disclosure, or the parts contributing to the related art, or parts of the technical schemes may be implemented in the form of a software product. The computer software product is stored in a storage medium and may include multiple instructions configured to enable a computing device, which may be a personal computer, server or network device, to execute all or part of the operations of a method according to an embodiment of the disclosure. The foregoing storage medium may be a USB flash disk, portable hard drive, ROM, RAM, diskette or CD and another medium capable of storing program codes.

The foregoing merely illustrates the specific implementations of the disclosure, but the scope of the disclosure is not limited thereto. Any person skilled in the art may make variations and substitution without departing from the spirit and scope of the disclosure, which should fall within the scope of the disclosure. Therefore, the scope of the disclosure should be defined by the scope of the claims.

The invention claimed is:

1. A data transmission method, comprising:
receiving, by a target base station, a Radio Resource Control (RRC) resume request message and small data from a terminal device, wherein a media access control service data unit (MAC SDU) corresponding to the RRC resume request message and a MAC SDU corresponding to the small data are multiplexed and transmitted in a same media access control packet data unit (MAC PDU); and
sending, by the target base station, a retrieve terminal context request message to an anchor base station, wherein the retrieve terminal context request message is configured to carry first information configured to enable the anchor base station to determine whether to send a context of the terminal device to the target base station,
wherein the method further comprises:
in response to receiving a retrieve terminal context response message from the anchor base station by the target base station, sending the small data by the target base station to a core network; and
in response to receiving a retrieve terminal context failure message from the anchor base station by the target base station, sending the small data by the target base station to the core network through the anchor base station,
wherein sending, by the target base station, the retrieve terminal context request message to the anchor base station comprises:
acquiring a first terminal identifier from the RRC resume request message, addressing the anchor base station according to the first terminal identifier, and sending the retrieve terminal context request message to the anchor base station,
wherein the first information carried in the retrieve terminal context request message comprises at least one of following:
small data transmission indication information, or bearer configuration information corresponding to the small data.

2. The method of claim 1, wherein the RRC resume request message is transmitted through a common control channel (CCCH) and the small data is transmitted through a dedicated transmission channel (DTCH).

3. The method of claim 1, further comprising:
receiving, by the target base station, the retrieve terminal context response message from the anchor base station, wherein the retrieve terminal context response message is configured to carry the context of the terminal device;
resuming, by the target base station, the context of the terminal device, and transmitting the small data to a packet data convergence protocol (PDCP) stratum for at least one of decryption or integrity verification according to the bearer configuration information corresponding to the small data; and triggering, by the target base station, a core network control plane network element to perform path switching, establishing a GPRS Tunnelling Protocol (GTP) tunnel between the target base station and a core network user plane network element after receiving a path switch acknowledge message from the core network control plane network element, and sending the small data to the core network user plane network element through the GTP tunnel.

4. The method of claim 1, further comprising:
receiving, by the target base station, the retrieve terminal context failure message from the anchor base station, wherein the retrieve terminal context failure message is configured to carry GTP tunnel information configured by the anchor base station; and
sending, by the target base station, the small data to the anchor base station through a GTP tunnel based on the GTP tunnel information, wherein the context of the terminal device is resumed, the small data is transmitted to a PDCP stratum for at least one of decryption or integrity verification according to the bearer configuration information corresponding to the small data, and then the small data is sent to a core network user plane network element.

5. The method of claim 4, wherein the GTP tunnel information configured by the anchor base station comprises at least one of the following: a tunnel endpoint identifier (TEID) corresponding to the GTP tunnel, or bearer configuration information associated with the GTP tunnel.

6. The method of claim 5, wherein,
when the small data comprises small data corresponding to a data resource bearer (DRB), the GTP tunnel information configured by the anchor base station comprises GTP tunnel information corresponding to the DRB; and
when the small data comprises small data corresponding to multiple DRBs, the GTP tunnel information configured by the anchor base station comprises GTP tunnel information respectively corresponding to the multiple DRBs.

7. The method of claim 4, wherein the retrieve terminal context failure message is further configured to carry an RRC release message, and the method further comprises:
after receiving the retrieve terminal context failure message from the anchor base station, acquiring the RRC release message by the target base station from the retrieve terminal context failure message and sending the RRC release message by the target base station to the terminal device.

8. A communication device, comprising: a processor and a memory, wherein the processor is configured to execute the computer program stored in the memory to cause the communication device to perform operations comprising:
receiving a Radio Resource Control (RRC) resume request message and small data from a terminal device, wherein a media access control service data unit (MAC SDU) corresponding to the RRC resume request message and a MAC SDU corresponding to the small data are multiplexed and transmitted in a same media access control packet data unit (MAC PDU); and
sending a retrieve terminal context request message to an anchor base station, wherein the retrieve terminal context request message is configured to carry first information configured to enable the anchor base station to determine whether to send a context of the terminal device to the target base station,
wherein the processor is configured to execute the computer program to cause the communication device to perform operations further comprising:
in response to receiving a retrieve terminal context response message from the anchor base station by the communication device, sending the small data to a core network; and
in response to receiving a retrieve terminal context failure message from the anchor base station by the communication device, sending the small data to the core network through the anchor base station,
wherein the processor is configured to execute the computer program to cause the communication device to send the retrieve terminal context request message to the anchor base station by actions of:
acquiring a first terminal identifier from the RRC resume request message, addressing the anchor base station according to the first terminal identifier, and sending the retrieve terminal context request message to the anchor base station,
wherein the first information carried in the retrieve terminal context request message comprises at least one of following:
small data transmission indication information, or bearer configuration information corresponding to the small data.

9. The communication device of claim 8, wherein the processor is configured to execute the computer program to cause the communication device to:
receive the retrieve terminal context failure message from the anchor base station, wherein the retrieve terminal context failure message is configured to carry GTP tunnel information configured by the anchor base station; and
send the small data to the anchor base station through a GTP tunnel based on the GTP tunnel information, wherein the context of the terminal device is resumed, the small data is transmitted to a PDCP stratum for at least one of decryption or integrity verification according to the bearer configuration information corresponding to the small data, and then the small data is sent to a core network user plane network element.

10. The communication device of claim 9, wherein the GTP tunnel information configured by the anchor base station comprises at least one of the following: a tunnel endpoint identifier (TEID) corresponding to the GTP tunnel, or bearer configuration information associated with the GTP tunnel.

11. The communication device of claim 10, wherein,
when the small data comprises small data corresponding to a data resource bearer (DRB), the GTP tunnel information configured by the anchor base station comprises GTP tunnel information corresponding to the DRB; and
when the small data comprises small data corresponding to multiple DRBs, the GTP tunnel information configured by the anchor base station comprises GTP tunnel information respectively corresponding to the multiple DRBs.

12. The communication device of claim 9, wherein the retrieve terminal context failure message is further configured to carry an RRC release message;
the processor is configured to execute the computer program to cause the communication device to acquire the RRC release message from the retrieve terminal context failure message and send the RRC release message to the terminal device.

13. The communication device of claim 8, wherein the processor is configured to execute the computer program to cause the communication device to:
- receive the retrieve terminal context response message from the anchor base station, wherein the retrieve terminal context response message is configured to carry the context of the terminal device;
- resume the context of the terminal device and transmit the small data to a packet data convergence protocol (PDCP) stratum for at least one of decryption or integrity verification according to the bearer configuration information corresponding to the small data; and
- trigger a core network control plane network element to perform path switching, establish a GPRS Tunnelling Protocol (GTP) tunnel directed to a core network user plane network element after receiving a path switch acknowledge message from the core network control plane network element, and send the small data to the core network user plane network element through the GTP tunnel.

14. The communication device of claim 8, wherein the RRC resume request message is transmitted through a common control channel (CCCH) and the small data is transmitted through a dedicated transmission channel (DTCH).

15. A chip, comprising: a processor configured to call and run a computer program from a memory to enable a device mounted with the chip to perform operations comprising:
- receiving a Radio Resource Control (RRC) resume request message and small data from a terminal device, wherein a media access control service data unit (MAC SDU) corresponding to the RRC resume request message and a MAC SDU corresponding to the small data are multiplexed and transmitted in a same media access control packet data unit (MAC PDU); and
- sending a retrieve terminal context request message to an anchor base station, wherein the retrieve terminal context request message is configured to carry first information configured to enable the anchor base station to determine whether to send a context of the terminal device to the target base station,
wherein the processor is configured to execute the computer program to cause the chip to perform operations further comprising:
- in response to receiving a retrieve terminal context response message from the anchor base station, sending the small data to a core network; and
- in response to receiving a retrieve terminal context failure message from the anchor base station, sending the small data to the core network through the anchor base station,
wherein the operation of sending the retrieve terminal context request message to the anchor base station comprises:
- acquiring a first terminal identifier from the RRC resume request message, addressing the anchor base station according to the first terminal identifier, and sending the retrieve terminal context request message to the anchor base station,
wherein the first information carried in the retrieve terminal context request message comprises at least one of following: small data transmission indication information, or bearer configuration information corresponding to the small data.

16. The chip of claim 15, wherein the RRC resume request message is transmitted through a common control channel (CCCH) and the small data is transmitted through a dedicated transmission channel (DTCH).

17. The chip of claim 15, wherein the retrieve terminal context failure message is further configured to carry an RRC release message;
the processor is configured to execute the computer program to cause the chip to acquire the RRC release message from the retrieve terminal context failure message and send the RRC release message to the terminal device.

18. The chip of claim 15, wherein the processor is further configured to execute the computer program to cause the chip to:
- receive the retrieve terminal context response message from the anchor base station, wherein the retrieve terminal context response message is configured to carry the context of the terminal device;
- resume the context of the terminal device, and transmit the small data to a packet data convergence protocol (PDCP) stratum for at least one of decryption or integrity verification according to the bearer configuration information corresponding to the small data; and
- trigger a core network control plane network element to perform path switching, establishing a GPRS Tunnelling Protocol (GTP) tunnel between the target base station and a core network user plane network element after receiving a path switch acknowledge message from the core network control plane network element, and send the small data to the core network user plane network element through the GTP tunnel.

19. The chip of claim 15, wherein the processor is further configured to execute the computer program to cause the chip to:
- receive the retrieve terminal context failure message from the anchor base station, wherein the retrieve terminal context failure message is configured to carry GTP tunnel information configured by the anchor base station; and
- send the small data to the anchor base station through a GTP tunnel based on the GTP tunnel information, wherein the context of the terminal device is resumed, the small data is transmitted to a PDCP stratum for at least one of decryption or integrity verification according to the bearer configuration information corresponding to the small data, and then the small data is sent to a core network user plane network element.

20. The chip of claim 19, wherein the GTP tunnel information configured by the anchor base station comprises at least one of the following: a tunnel endpoint identifier (TEID) corresponding to the GTP tunnel, or bearer configuration information associated with the GTP tunnel.

* * * * *